Inventor:
Wilhelm Ulmitz

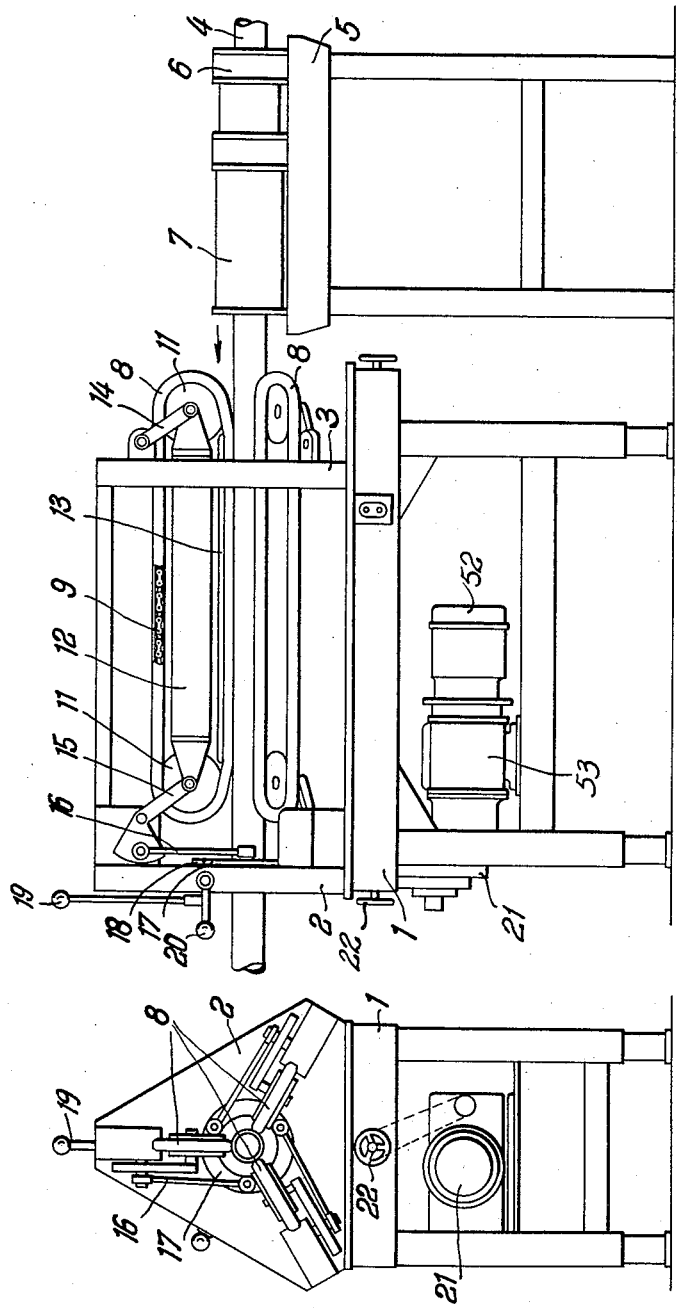

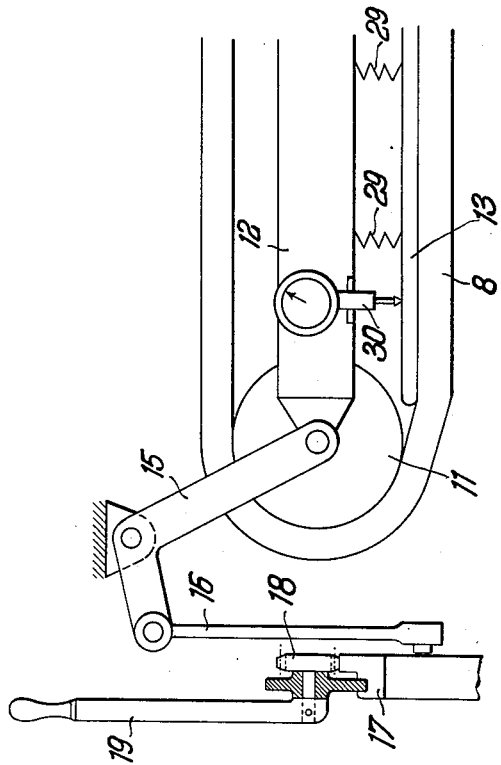
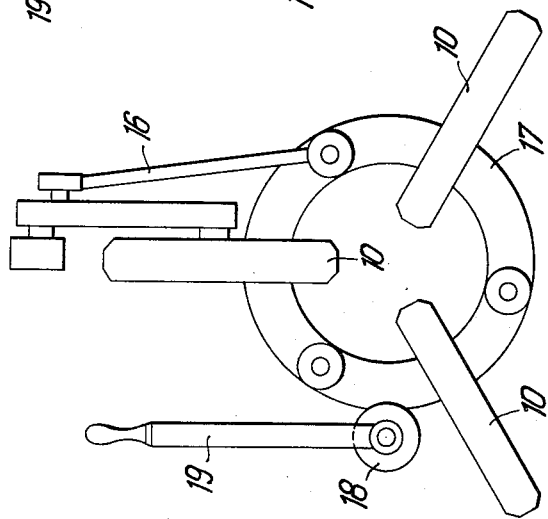

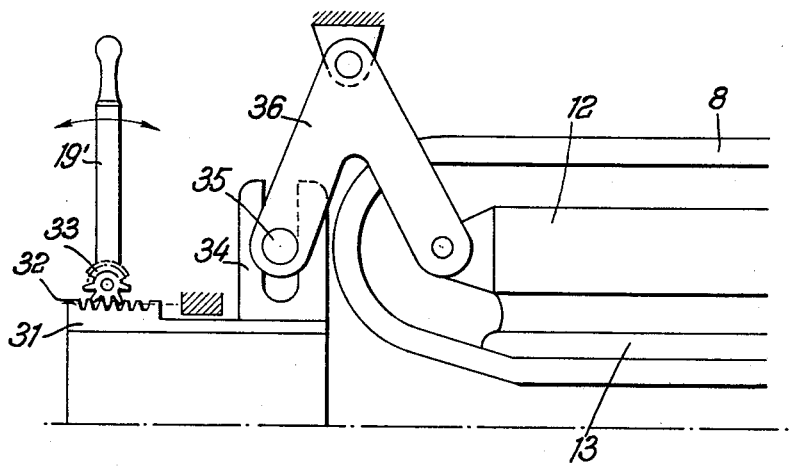
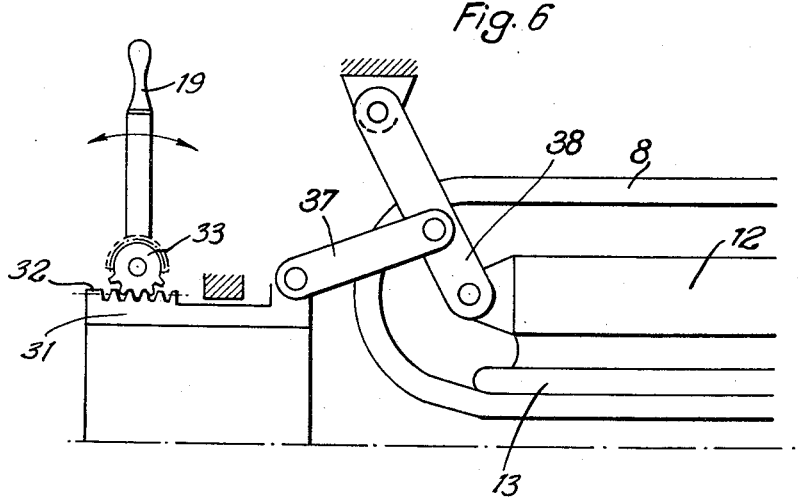

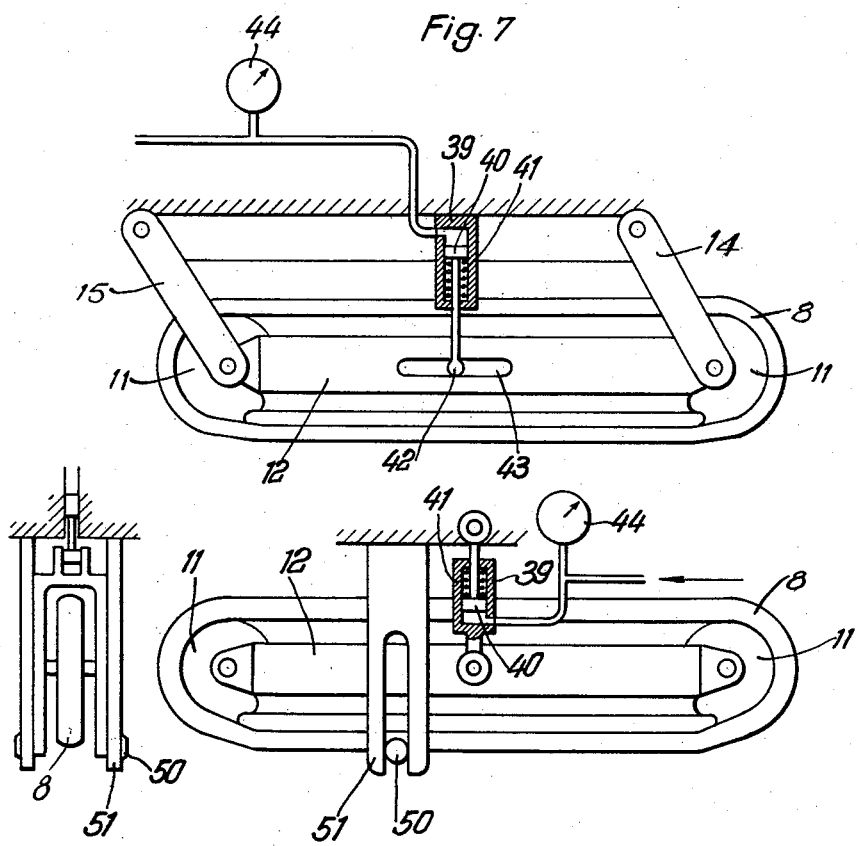

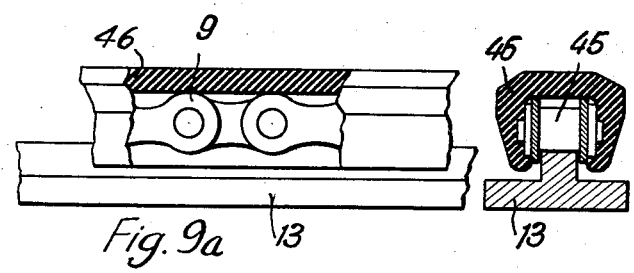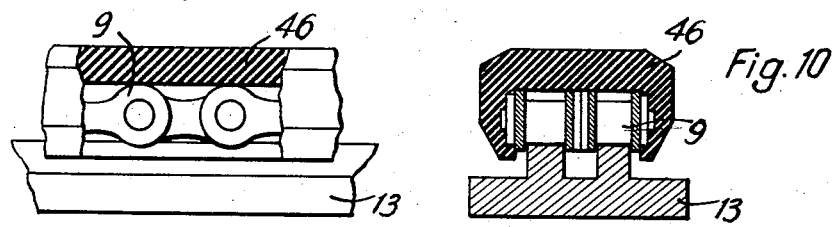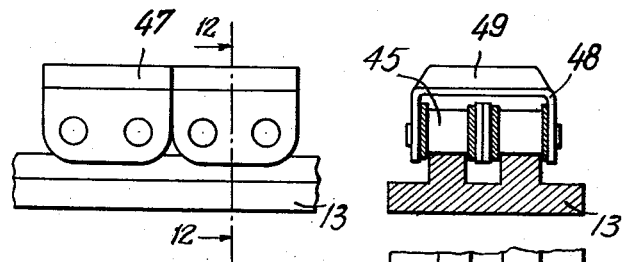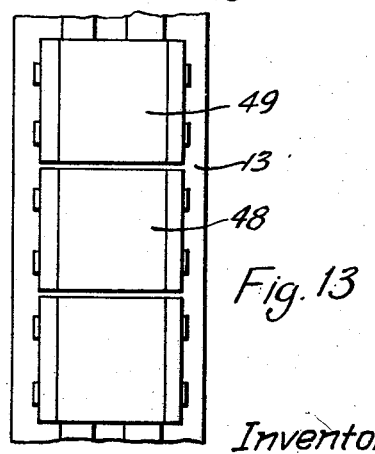

United States Patent Office 3,022,928
Patented Feb. 27, 1962

3,022,928
PROCESS FOR CONTINUOUSLY WITHDRAWING OR TRANSPORTING, SHAPED ELEMENTS, TUBES OR THE LIKE
Wilhelm Ulmitz, Troisdorf, Germany, assignor to Anton Reifenhaüser and H. Reifenhaüser, Troisdorf, Germany
Filed Aug. 29, 1956, Ser. No. 606,930
Claims priority, application Germany Aug. 30, 1955
3 Claims. (Cl. 226—172)

This invention relates to a process for continuously withdrawing or transporting, shaped elements, tubes or the like, preferably consisting of plastics, as well as cables, ropes or the like, and also to an apparatus for carrying this process into effect.

It is known to grip shaped elements, tubes or the like by a driving means and to transport them longitudinally at an adjustable constant speed. This procedure is preferably also adopted when withdrawing shaped elements, tubes or the like from the corresponding machines used for manufacturing the same, the withdrawal force being adapted to vary within a wide range, depending upon the material from which the said elements are formed.

It is also known to effect the transportation or withdrawal in a continuous manner, this being particularly advantageous when manufacturing endless shaped elements or the like.

Such withdrawn devices have acquired particular significance in the manufacture of shaped elements, tubes or the like from thermoplastic plastics and also in connection with the sheathing or wrapping of cables, ropes or the like by means of warm presses. These prior known withdrawal devices use separate rolls for withdrawing or transporting the continuous length or the like, and these rolls, especially with soft profiled elements, require such a high specific surface pressure at the point of contact that thereby the shaped elements are distorted or damaged, especially when only some of the rolls are driven, which is usually the case. Moreover, with sensitive multicore cables or the like, too high a specific surface pressure has a detrimental effect, because thereby the inner structure of the cable or the like can be destroyed or damaged.

For withdrawing or transporting continuous lengths consisting of thermoplastic plastics, it is also known to use two caterpillar tracks which press on opposite sides of the continuous length, but in this case, a satisfactory guiding action is not always assured, especially with soft shaped elements. This uncertainty in the guiding of the element is further increased if one of the two caterpillar tracks is stationary and only the opposite one is urged against the said element for producing the bearing pressure and is non-positively driven for the purpose of withdrawing or transporting the continuous shaped element.

In contrast hereto, for withdrawing or transporting the continuous shaped elements, it is proposed according to the invention that at least three endless chain-like or band-like conveyor tracks which are centrally driven at the same and preferably an adjustable speed and are distributed over the periphery of the said element should be urged against the latter for the purpose of producing a low specific surface pressure.

When withdrawing or transporting shaped elements or the like which have been freshly manufactured by thermoplastic plastic being forced through a nozzle, provision is also made according to the invention for the said elelents being conducted through a cooling bath after issuing from the said nozzle and before being subjected to the pressure action by the conveyor tracks, this arrangement contributing to an essential degree to avoiding deformations of the cross-section. If the shaped element issuing from the nozzle of a worm press or the like is sent while in a still plastic condition through the calibrating nozzle of a calibrating device, the shaped element issuing from the said nozzle is first of all conducted through a cooling bath and is only then subjected to the withdrawal force of the conveyor tracks.

In order to carry the aforementioned process into effect, the invention provides an apparatus which comprises at least three chain-like or band like endless conveyor tracks which are distributed around a central axis and which can be driven jointly at the same and preferably an adjustable speed, the sections of the said tracks adjacent the central axis travelling over guide means which can be urged towards the said axis, a central control means being used for the bearing pressures to be applied to the shaped element or the like to be withdrawn by the conveyor tracks through the guide means of the latter.

The said control means is preferably so constructed that the spatial reference axis of the shaped element does not experience any change due to these bearing pressures exerted on said element by means of the conveyor tracks, but remains the same. For this purpose, the invention provides for the central control of the guide means to be effected through parallelogram linkages, the arrangement preferably being that one side of each parallelogram is formed by the actual guide means of the conveyor track and the parallelogram linkages are adapted to be rocked jointly by a central adjustment means.

The conveyor tracks are thus urged against the shaped element with uniform pressure over their entire length, so that owing to the surface of contact being large, a substantially smaller specific surface pressure is sufficient for driving the shaped element. The use of preferably three conveyor tracks offers the advantage that the shaped element is satisfactorily guided and its reference axis is therefore maintained. By the expression "reference axis," there is to be understood an axis which is arbitrarily disposed longitudinally through the cross-section of the shaped element, for example, the geometrical axis of symmetry. If shaped elements which are very sensitive to pressure and which require a high withdrawal force are to be withdrawn, it is advisable to use more than three conveyor tracks.

The features mentioned above and other essential features of the invention will be apparent from the following description of a number of embodiments of a withdrawal apparatus according to the invention, these embodiments being shown in the drawing, wherein:

FIGURE 1 is a side elevation of a complete withdrawal apparatus according to the invention with a calibrating device connected in front thereof, the said apparatus preferably being used for withdrawing shaped plastic elements from a worm press;

FIG. 1a is an end elevation of the same;

FIG. 4 is a side elevation of the preferred adjustment means for the common movement of three conveyor tracks;

FIG. 4a is an end elevation of the same;

FIG. 5 shows in side elevation a further embodiment for the joint movement of the conveyor tracks;

FIG. 6 shows in side elevation another embodiment for the joint movement of the conveyor tracks;

FIG. 7 is a diagrammatic side elevation of an hydraulic individual pressure control means for the conveyor tracks;

FIG. 8 is a diagrammatic side elevation of a modified form of hydraulic pressure control means;

FIG. 8a is an end elevation of the same;

FIG. 9 is a vertical cross-section of a roller chain conveyor with a continuous U-section as a friction lining;

FIG. 9a is a fragmentary side elevation of the same partly in section;

FIG. 10 is a vertical cross-section of a roller chain conveyor on two guide rails;

FIG. 10a is a fragmentary side elevation of the same partly in section;

FIG. 11 is a side elevation of a roller chain conveyor with separate friction linings fitted thereon;

FIG. 12 is a vertical transverse section on the line 12—12 of FIG. 11 and

FIG. 13 is a plan view of the same.

Figure 2A:
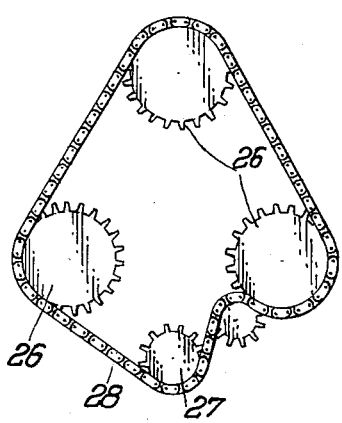
FIG. 2a is an end elevation of the same.

A table-like stand 1 (FIGURE 1) carries two side frames 2 and 3 in which the entire withdrawal apparatus is arranged. The shaped element 4, which in the constructional example illustrated consists of a tube which is circular in cross-section, comes from a worm press and enters a calibrating device 5 from the right (FIGURE 1), the said device comprising a calibrating nozzle 6 and also a cooling bath 7 following the latter, the said tube being withdrawn from the said bath with a predetermined withdrawal force by the withdrawal apparatus.

Arranged in the upper part of the withdrawal apparatus are three conveyor tracks 8, which are constructed as endless roller chains 9 on which are fitted U-shaped treads 10 (FIG. 4a) consisting of rubber or the like. Each conveyor runs over two sprocket wheels 11, each of which is driven in a supporting manner to be further described. The sprocket wheels 11 are mounted to rotate in a cross-member 12, which carries a guide rail 13 on its side facing the shaped element. The roller chain runs on the guide rail and is urged by the latter constantly against the shaped element or tube 4. Each cross-member 12 is pivoted at the one end of two links 14 and 15, which are so pivotally connected at their other ends to the side frames 2 and 3 that they form a parallel linkage with the cross-member. The links 15 form one of the arms of a two-armed lever, to the other arm of which is pivoted a rod 16 connecting the lever to an adjusting ring 17, which is disposed coaxially of the reference axis of the tube or the like and is rotatable about the said axis. A turning movement of the adjusting ring 17 therefore causes a uniform and simultaneous movement of all conveyors towards or away from the reference axis of the tube or the like. The adjusting ring 17 carries on a part of its periphery a gear which is engaged by a pinion 18, this pinion being rotatable by means of a hand lever 19. A turning movement applied to the hand lever 19 therefore causes a corresponding rotation of the adjusting ring, so that by actuating the hand lever, it is possible for the three conveyors 8 to be uniformly adjusted. After the conveyors have been applied to the tube by actuating the hand lever, the latter is secured by a locking lever 20 having a detent which is rocked into engagement with the peripheral gear on ring 17.

The sprocket wheels 11 are jointly driven at the same speed by means of a driving assembly 21 arranged in the lower part of the apparatus. The driving means consists, for example, of an electric motor 52 with an infinitely variable regulating gear 53, the driven speed of which is adjustable by a hand wheel 22.

Figure 2:
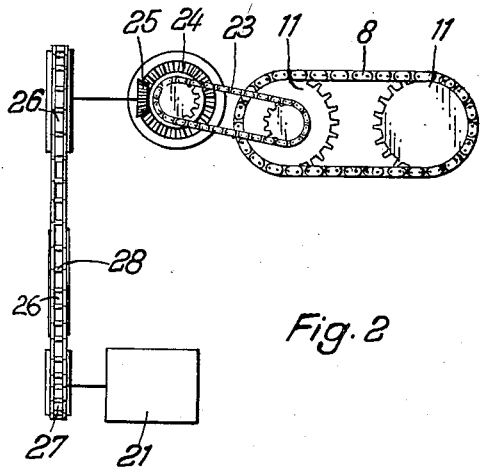
FIG. 2 is a diagrammatic side elevation showing the central drive with three conveyor tracks only one of which is shown.

FIGURES 2 and 2a show one constructional form of the common drive means for the three conveyors 8. In this example, the driving assembly 21 drives three sprocket wheels 26 through a sprocket wheel 27 and an endless chain 28. Each of these sprocket wheels drives a sprocket wheel 11 through two bevel gears 25 and 24 and also a chain 23, the said sprocket wheel in its turn driving the conveyor 8.

Figure 3A:
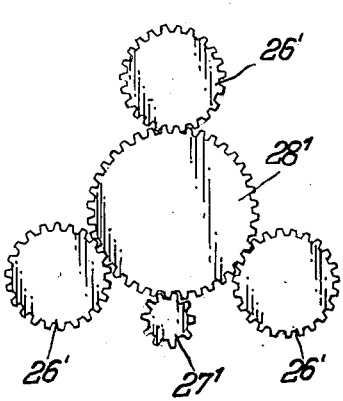
FIG. 3a is an end elevation of the same.
Figure 3:
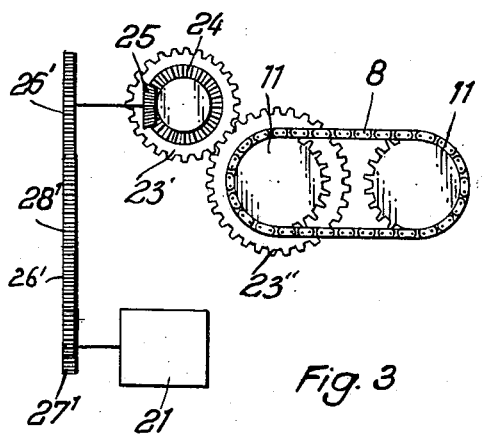
FIG. 3 is a diagrammatic side elevation of a modified form of a common drive.

FIGURE 3 shows another constructional form of the common drive means, in which case a pair of meshing gear wheels 27', 28' are chosen instead of the chain transmission 28, while the chain 23 is replaced by a pair of gear wheels 23' 23", by which one of the two sprocket wheels 11, 11 of the conveyor 8 is driven.

FIGURE 4 is a view on a larger scale showing the central control means of the conveyors 8, this means having already been illustrated in FIGURE 1. This figure also illustrates a resilient connection of the guide rail 13 with the cross-member 12 by means of two springs 29 which are indicated diagrammatically. This spring system serves the purpose of applying the conveyor 8 resiliently to the tube or the like and simultaneously for preventing the permissible bearing pressure being exceeded. The pressure transmitted from the shaped element through the conveyor 8 to the guide rail 13 can be indicated by an indicating instrument 30 (in this case a dial gauge), which measures the displacement of the guide rail and is calibrated in pressure units, taking into account the spring constants of the spring 29.

FIGURE 5 shows another constructional form of the central control of the conveyors according to the invention. In this case, instead of using the rotatable adjusting ring 17, there is employed an annular bridge 31 which is displaceable in the direction of the profiled member to be withdrawn and which carries a rack 32 which is engaged by a pinion 33 connected to a hand lever 19'. At its periphery, the bridge 31 carries forks 34 which drive the guide pins 35 of the bellcrank lever 36 in the longitudinal direction. The bellcrank lever 36, together with the cross-member 12 and the link rods 14, form the parallelogram guide means.

FIGURE 6 shows another constructional form of this central adjustment device, in which instead of using the forks 34 and the bellcrank lever 36, a pivoted connection causes the movement of the link rod 38 of the parallelogram guideway through a link 37.

The constructional forms of the central adjustment means which have hereinbefore been described cause a positive and uniform movement of all conveyors 8 towards the shaped element, this providing the particular advantage that the spatial reference axis of the element is maintained and, when three conveyors are used, there is also produced a constant bearing pressure of all conveyors. In certain cases, however, it can be desirable also to produce a constant bearing pressure of all conveyors on the profile when using more than three conveyors, without it being necessary for the reference axis of the profile to be absolutely maintained. In a certain respect, this problem is already solved by the spring suspension of the guide tracks as shown in FIGURE 4. Another construction of the central control of all conveyors in accordance with the invention employs hydraulic or pneumatic control elements which are supplied with equal pressure by means of a common compressor or the like.

FIGURE 7 shows one constructional form of such an arrangement. In this example, a cylinder 39 with a piston 40 and a compression spring 41 for each separate conveyor is used as the hydraulic control element. A piston rod transmits the force to the cross-member 12 through a roller 42, which is able to roll in a slot or the like 43 in the cross-member. The pressure obtaining in the pressure cylinders is indicated by a pressure gauge 44 and is proportional to the bearing pressure of the conveyor 8 against the shaped element. The pressure gauge 44 can also be so calibrated that it directly indicates the bearing pressure or the bearing force of the conveyor against the shaped element. The parallel guide means is also preferably effected in this case by a parallelogram linkage.

FIGURE 8 shows another hydraulic or pneumatic control means. In this case, the bearing pressure is produced by the cylinder 39 and a piston 40 in conjunction with a compression spring 41, in that the pressure piston system 39, 40, 41 is pivotally arranged between a fixed pivot of the upper frame and the cross-member 12 and is urged against the conveyor 8. The longitudinal force exerted by the conveyor on the cross-member 12 is resisted by a pair of rollers 50 arranged on the cross-member, the said rollers being guided in the vertical slot of the fixed fork 51.

In one advantageous form of the invention, the conveyor 8 consists of a roller chain which rolls on the guide rail 13. FIGURES 9 to 13 show three constructional forms of such a conveyor.

In FIGURE 9, a guide rail 13 is of T-section, the separate rollers 45 of the chain links rolling on the upper surface of said T-section member. The chain is provided with a length of rubber substantially U-shaped in cross-section, leather, plastic, fabric or the like, in the form of an endless band which produces the friction necessary for driving purposes. The element 46 is so connected to the roller chain by sticking, vulcanisation, riveting or in any other manner, that it cannot be displaced relatively to the said chain; it is preferably engaged with the roller chain under tension.

FIGURE 10 shows another constructional form of the roller chain with a continuous element U-shaped in cross-section, each chain link rolling on two bearing surfaces of the guide rail in order to produce a more reliable guiding action and a better pressure transmission. If necessary, the number of the supporting surfaces can be increased to more than two.

With high withdrawal forces, the connection between the roller chain and the U-section member presents technical difficulties. For such cases, as a further feature of the invention, a conveyor according to FIGURE 11 is employed, in which the continuous U-section element is replaced by separate driver elements 47 disposed adjacent one another. Each driver element consists of a bridge 48, which carries a friction lining 49 on its side facing the shaped element. The individual bridges are so connected to the rollers or pins of the roller chain that their friction lining are adjacent one another without any gap while travelling over the rectilinear guide rail and thereby form a continuous smooth conveyor track. Even with a high withdrawal force, it is also ensured in this manner that the tensile force of each separate friction lining is transmitted to the roller chain. As the conveyor track runs around the sprocket wheels 11, the driver elements 47 correspondingly move apart so that it is not possible for any expansion forces to occur on the friction lining.

I claim:

1. An apparatus for continuously advancing a tubular shaped article of indeterminate length along its axis comprising three radially spaced supporting members, a pair of pivoted parallel links of equal length holding each member parallel to said axis, an endless conveyor rotatably carried on each of said members for engagement longitudinally on the article, means for driving said conveyers at an adjustable common speed, and means for simultaneously moving said supporting members equidistantly radially of said article axis.

2. An apparatus for continuously advancing a tubular shaped article of indeterminate length along its axis comprising opposing frames, three supporting members mounted on the frames parallel to the axis of the tubular article and radially spaced apart, a pair of pivoted parallel links of equal length holding each member parallel to said axis, an endless conveyor rotatably carried on each of said members for engagement longitudinally on the article, means for driving said conveyors at an adjustable common speed, an adjusting ring rotatably mounted on one frame concentric to the said axis, a rod pivotally connecting the ring to one link of each pair, and means for rotatably adjusting the ring.

3. An apparatus for continuously advancing a tubular shaped article of indeterminate length along its axis comprising three radially spaced supporting members, a pair of pivoted parallel links of equal length holding each member parallel to said axis, an endless conveyor rotatably carried on each of said members for engagement longitudinally on the article, means for driving said conveyers at an adjustable common speed, means for simultaneously moving said supporting members equidistantly relative to said article axis, and a separate guide member for pressing each supporting member against the article.

References Cited in the file of this patent

UNITED STATES PATENTS

| | | |
|---|---|---|
| 1,282,788 | Fenn | Oct. 29, 1918 |
| 1,355,616 | Mohn | Oct. 12, 1920 |
| 1,568,594 | Flint | Jan. 5, 1926 |
| 1,699,272 | Wilkes et al. | May 8, 1928 |
| 1,840,410 | Robinson | Jan. 12, 1932 |
| 1,904,885 | Seeley | Apr. 18, 1933 |
| 2,053,260 | Blashill | Sept. 8, 1936 |
| 2,541,201 | Buecken et al. | Feb. 13, 1951 |
| 2,655,066 | Siegerist | Oct. 13, 1953 |
| 2,709,000 | Frank et al. | May 24, 1955 |
| 2,742,144 | Meyerbach | Apr. 17, 1956 |
| 2,774,110 | Walters | Dec. 18, 1956 |
| 2,777,329 | Banker | Jan. 15, 1957 |

FOREIGN PATENTS

| | | |
|---|---|---|
| 837,742 | Germany | May 2, 1952 |
| 532,434 | France | Nov. 15, 1921 |